United States Patent [19]

Nakamura

[11] Patent Number: 4,947,313

[45] Date of Patent: Aug. 7, 1990

[54] DIRECT CURRENT POWER SUPPLY

[75] Inventor: Tomio Nakamura, Kuki, Japan

[73] Assignee: Mitsuoka Electric Manufacturing Co., Ltd., Tondabayashi, Japan

[21] Appl. No.: 453,161

[22] Filed: Dec. 19, 1989

Related U.S. Application Data

[63] Continuation of Ser. No. 204,374, Jun. 9, 1988, abandoned.

[30] Foreign Application Priority Data

Jun. 13, 1987 [JP] Japan ............................... 62-147689

[51] Int. Cl.$^5$ ......................... H02M 7/04; G05F 5/00

[52] U.S. Cl. ..................................... 363/143; 323/299

[58] Field of Search ............... 323/255, 258, 299, 300, 323/301, 340, 343; 363/86, 88, 89, 143

[56] References Cited

U.S. PATENT DOCUMENTS

| | | | |
|---|---|---|---|
| 3,720,868 | 3/1973 | Lee | 363/143 X |
| 4,013,941 | 3/1977 | Moore | 323/301 |
| 4,090,234 | 5/1978 | Bierly | 363/88 |
| 4,733,158 | 3/1988 | Marchione et al. | 363/89 X |
| 4,780,805 | 10/1988 | Chewuk et al. | 323/299 X |

FOREIGN PATENT DOCUMENTS

| | | |
|---|---|---|
| 0168183 | 1/1986 | European Pat. Off. . |
| 1255846 | 12/1971 | United Kingdom . |
| 1279553 | 6/1972 | United Kingdom . |
| 1505289 | 3/1978 | United Kingdom . |

*Primary Examiner*—Mark O. Budd
*Assistant Examiner*—Emanuel Todd Voeltz
*Attorney, Agent, or Firm*—Cushman, Darby & Cushman

[57] ABSTRACT

An inventive series-regulator-type direct current power supply includes a power transformer of which a secondary winding has a plurality of output terminals, a plurality of corresponding rectifier systems connected to the output terminals, an input voltage-detecting circuit detecting a predetermined level of an input alternating current voltage, and a switching circuit opening and closing a line of the rectifying circuit systems. The inventive system selectively switches the output terminals of the secondary winding of the power supply transformer and switches the rectifying circuit, in response to a change in the amplitude of a primary input voltage in order to suppress a variation of a direct current output voltage.

8 Claims, 6 Drawing Sheets

DIRECT CURRENT POWER SUPPLY

This is a continuation of application Ser. No. 07/204,374, filed Jun. 9, 1988, which was abandoned upon the filing hereof.

BACKGROUND OF THE INVENTION

1. Field of the Invention

This invention relates to a direct current power supply deriving a direct current output from an alternating current input and more particularly to a direct current power supply converting alternating current to direct current and connectable directly to household current with various rated voltages.

2. Description of the Prior Art

Today, a power supply system with values of various voltages etc. in countries of the world has not yet been united. The countries are using commercial current with various rated voltages in accordance with backgrounds of their histories, societies and economies.

For example, the rated voltage of a household current is frequently selected at the range of 100 V-120 V for 100 V-system power supply systems or 200 V-240 V for 200 V-system power supply systems. In addition, the domestic power supply system in a single country possibly uses a mixture of the 100 V-system and 200 V-system power supply systems.

Thus, a direct current power supply system for electronic devices is required which can flexibly cope with various voltages of commercial current. A switching power supply is known as a direct current power supply which can cope with two kinds of high and low voltages.

As well known, a switching power supply directly rectifies a commercial alternating current into direct current, without a power transformer, and then converts the direct current into a high-frequency alternating current through an inverter, and then reduces the voltage of the high-frequency alternating current to a desired value through a high-frequency transformer, whose output is rectified and smoothing circuit to provide the required DC output. A power transistor regulates the voltage of the direct current output by means of pulse width modulation.

Since this switching power supply can readily cope with wide variations of the alternating current input voltage and shows a high efficiency, the switching regulator system can handle various voltages. However, the switching regulator system entails a problem in that the action of the switching power transistor causes a switching noise which includes not only a switching-frequency component but also wide noise components up to a high-frequency band and radio frequency band. Therefore, the switching regulator system causes problems on devices which tend to be affected by noises from a radio receiver and the like.

In addition, a method using a direct current power supply system comprising a voltage-reducing power transformer, a rectifying-and-smoothing circuit and a series regulator is known as means for handling the different voltages.

As well known, the series-regulator-type direct current power supply system steps down the voltage of a commercial power supply into a desired value through a power transformer and then rectifies the resulting current into a direct current. The output voltage of the resulting direct current is stabilized by the voltage drop between the collector and emitter of a power transistor of a main line so that no switching noises are produced. However, this system necessarily produces a power loss constituting a product of the voltage drop between the collector and emitter of the power transistor and a load current. The voltage drop to be burdoned on the power transistor and the power loss increase as the input voltage increases. Thus, a problem of heat radiation becomes more important.

Consequently, this system cannot handle the wide variations of the alternating current input voltage in principle and has conventionally provided a primary winding of a power transformer with a plurality of taps and a selector switch, a corresponding selection being manually carried out in response to various rated voltages of a commercial power supply.

The use of the conventional switching-regulator-type power supply system as a direct current power supply system of a radio receiver and the like is difficult because of the occurrence of the switching noises. In addition, this system is complicated and costly. The series-regulator-type direct current power supply system includes a type which provides the primary winding of the input power transformer with the various taps and with the selector switch in order to handle different voltages, the selector switch being manually operated in response to the rating of input voltages, and another type which, without the selector switch, requires the circuit design affording allowances for parts rating and heat-radiation design and allowing an increase in power loss and does not have a selector switch, so as to handle both the higher-voltage and lower-voltage cases of the input power supply. Voltage selector type incurs increases in cost, size and weight and a prominent decrease in efficiency. Thus, the use of the latter type is not reasonable. The former type requires a troublesome actuation of the selector switch and may possibly damage devices due to a misoperation of the selector switch.

SUMMARY OF THE INVENTION

This invention has been made in view of the above-mentioned problems.

An object of this invention is to provide a series-regulator-type direct current power supply which will not produce a switching noise and is small, lightweight and economical and does not require the manual operation of a selector switch.

The above object can be achieved by the means, as recited in claims, comprising: a power transformer of which a secondary winding has a plurality of output terminals; a plurality of corresponding rectifying circuit systems connected to the output terminals; a circuit detecting a predetermined level of a primary or input voltage; and a switching circuit opening and closing corresponding rectifying circuits in response to a level detected by the input-voltage-detecting circuit, whereby the direct current power supply makes a selection out of the rectifying circuits in response to a variation of the primary or input voltage so as to suppress a variation of a direct current output voltage.

The direct current power supply of this invention will not produce switching noises as produced by switching regulators and is small and lightweight. It requires no need for actuating a selector switch and cannot be damaged by a misoperation of the selector switch.

BRIEF DESCRIPTION OF DRAWINGS

FIG. 5(*b*) is an illustration of the operation of the inventive system when the input voltage of the 200 V-system;

DESCRIPTION OF THE PREFERRED EMBODIMENT

Figure 1:
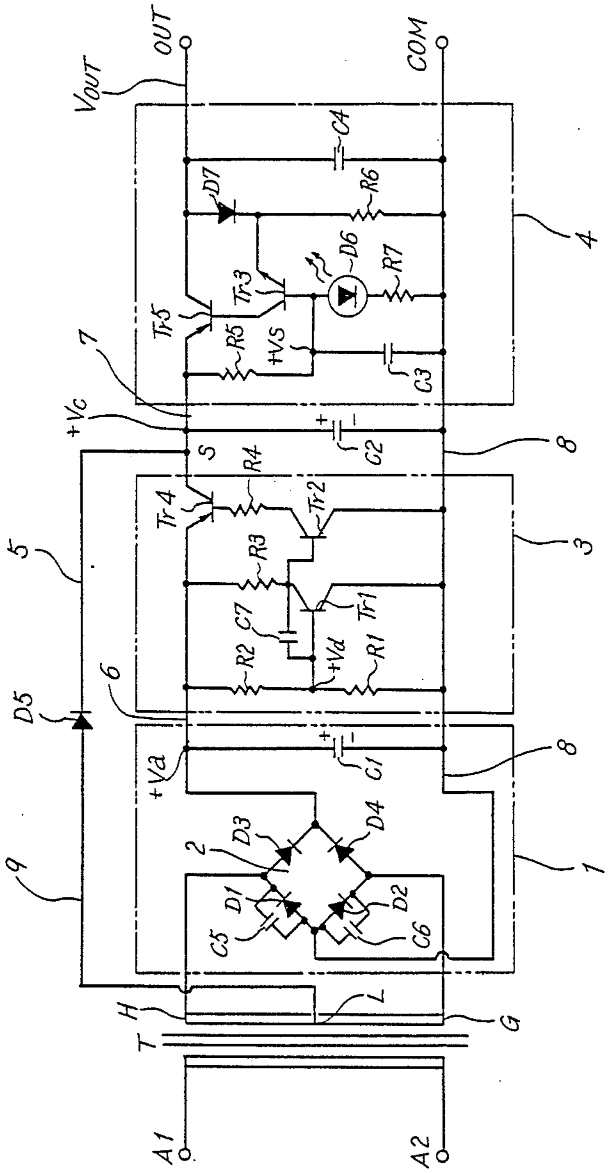
FIG. 1 illustrates the overall arrangement of one embodiment of this invention.

FIG. 1 illustrates a direct current power supply according to one embodiment of this invention. A rectifying and smoothing circuit is indicated at 1. A diode bridge circuit is indicated at 2. A voltage detector is indicated at 3. A voltage regulator stabilizer is indicated at 4. A line connected to a diode D5 is indicated at 5. An output line of the rectifying and smoothing circuit 1 is indicated at 6. An output line of a main smoothing capacitor C2 is indicated at 7. A common line is indicated at 8. Primary-winding-side or input terminals of a power transformer T are indicated at A1 and A2. The power transformer is indicated at T and reduces voltage. Two output terminals across a secondary winding are indicated at H and G. A tap of the secondary winding is indicated at L. Diodes are indicated at D1, D2, D3, D4 and D5. A voltage regulating diode is indicated at D6. A diode is indicated at D7. Respective transistors are indicated at Tr1, Tr2 and Tr3. A switching transistor is indicated at Tr4. An output control transistor is indicated at Tr5. An auxiliary smoothing capacitor for detecting an input voltage is indicated at C1. A main smoothing capacitor is indicated at C2. A capacitor is indicated at C3. An output smoothing capacitor is indicated at C4. Respecting noise-damping capacitors are indicated at C5, C6 and C7. An output voltage of the rectifying and smoothing circuit 1 is indicated at +Va. A charging voltage of the main smoothing capacitor C2 is indicated at +Vc. A voltage across a resistor R1 is indicated at +Vd. A base voltage is indicated at +Vs. An output voltage is indicated at $V_{out}$. An output terminal is indicated at OUT. An output terminal of the common line is indicated at COM.

The arrangement of the direct current power supply of this invention will be described hereinafter with reference to FIG. 1. A primary or input voltage of alternating current are applied to the primary or input terminals A1 and A2 of the power transformer T and reduced by the secondary winding to a desired value of voltage. The terminals H and G across the secondary winding are connected to an alternating current input side of the single-phase bridge rectifier 2 comprising the diodes D1, D2, D3, and D4. A rectified output of the single-phase bridge rectifier 2 is smoothed through the auxiliary smoothing capacitor C1 for detecting the input voltage and applied through the output line 6 to the voltage detector 3 as the output voltage +Va. The voltage detector 3 comprises a input voltage detecting circuit and a switching circuit operating in response to the action of the input voltage detecting circuit. The output voltage +Va of the rectifying and smoothing circuit 1 is divided through the resistors R1 and R2, resulting in the voltage +Vd across the resistor R1. One terminal of the resistor R1 is connected to the base of the NPN transistor Tr1 and the other is connected to both the emitter of the transistor Tr1 and the common line 8. The collector of the transistor Tr1 is connected through the resistor R3 to the output line 6 of the rectifying smoothing circuit 1. The capacitor C7 is a means for removing noises.

The base of the transistor Tr2 is connected to the collector of the transistor Tr2. The emitter of the transistor Tr2 is connected to the common line 8. The collector of the transistor Tr2 is connected through the resistor R4 to the base of the switching transistor Tr4. The emitter of the transistor Tr4 is connected to the output line 6 of the rectifying and smoothing circuit 1. The collector of the transistor Tr4 is connected to the main smoothing capacitor C2.

The secondary winding of the power transformer T includes a tap L deriving a predetermined voltage. The tap L is connected through the line 9 to the anode of the rectifying diode D5. The cathode of the diode D5 is connected through the line 5 to the output line 7 of the main smoothing capacitor C2. The tap L of the secondary winding of the power transformer T need not be exactly at mid point. The location of the tap L is totally selected in view of design of the power transformer and the effect of the constant-voltage regulator stabilizer 4. The secondary winding of the power transformer T may be divided into two windings.

The output line 7 of the main smoothing capacitor C2 is connected to the constant-voltage regulator stabilizer 4. The constant-voltage regulator stabilizer 4 is a circuit regulating the output voltage $V_{OUT}$ to a fixed value of voltage. This circuit does not require a special form. The constant-voltage regulator stabilizer 4 according to the present embodiment is just usual and obvious to a person concerned with the art. The constant-voltage regulator stabilizer 4 is so made up that the zener diode D6, capacitor C3 and resistor R7 together produce the base voltage +Vs for controlling the output voltage, that the transistor Tr3 compares the base voltage +Vs and the output voltage $V_{OUT}$, that the output-control transistor Tr5 carries out a constant-voltage control of the output voltage $V_{out}$, and that the resulting output of the transistor Tr5 is applied through the capacitor C4 to the external output terminals OUT and COM which deliver electric power to external loads.

The operation of the present embodiment will be described hereinafter. The object of the present invention is to produce a direct current power supply which can handle various levels of the primary or input AC voltages. The cases of the direct current power supply system with 100 V-and 200 V-system primary or input voltages as two examples of the input voltage will be illustrated.

Figure 2:
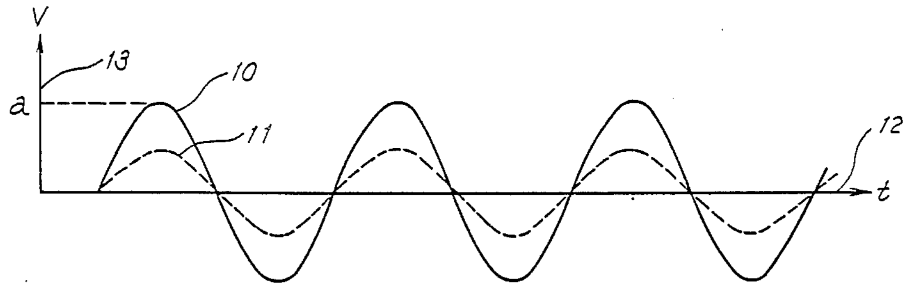
FIG. 2(*a*) and FIG. 2(*b*) are waveform diagrams illustrating the operation of the inventive system when an input voltage is of the 100 V-system.
Figure 2:
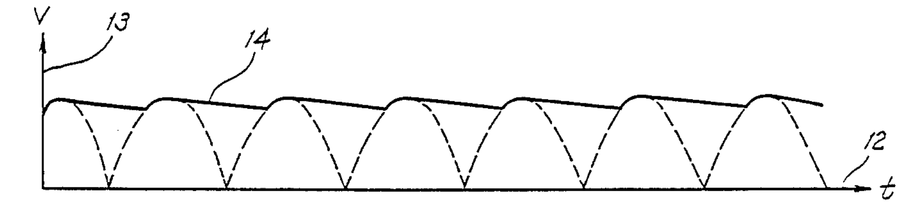

(1) Case of the 100 V-system primary or input voltage:

FIG. 2(*a*) and FIG. 2(*b*) are waveform diagrams illustrating an operation of the case of the 100 V-system primary or input voltage of the direct current power supply. The solid-lined voltage waveform of an alternating current appearing across the terminals HG (hereinafter, the arrow lying above letters indicates the direction of voltage vector) of the secondary winding of the power transformer is indicated at 10. The broken-lined voltage waveform of an alternating current appearing across the terminals HL or LG of the secondary winding is indicated at 11. The axis of time is indicated at 12. The ordinate representing a voltage level is indicated at 13. The output voltage (+Va) of the rectifying and smoothing circuit 1 is indicated at 14.

As understood from FIGS. 1 and 2(*a*), (*b*), the voltage 10 across the terminals H and G of the secondary winding produces the smoothed output voltage 14 (+Va) through the rectifying and smoothing circuit 1 of FIG. 1. The resulting direct current output voltage 14 is divided by the resistors R1 and R2 of FIG. 1 to produce the direct current voltage +Vd. When the input voltage is of the 100 V-system, the values of the resistors R1 and R2 cause the level of the direct current voltage +Vd with its ripples to be small enough not to exceed the voltage drop ($V_{BE}$) between the base and emitter of the transistor Tr1 (i.e., $+Vd \leqq V_{BE}$). Base current cannot almost pass between the base and emitter of the transistor Tr1. The transistor Tr1 is therefore off. Since the transistor Tr1 is off, base current passes through the resistor R3 from the output line 6 to the transistor Tr2. The transistor Tr2 is therefore on. When the transistor Tr2 is on, base current passes through the resistor R4 and the transistor Tr2 from the output line 6 through the switching transistor Tr4. The switching transistor Tr4 is therefore on. Thus, when the input voltage is of the 100 V-system, the output voltage +Va of the rectifying and smoothing circuit 1 charges the smoothing capacitor C2 at the voltage +Vc, reduced by a corresponding voltage drop of the saturation voltage $V_{CE}$ of the transistor Tr4. Since, normally, the saturation voltage $V_{CE}$ of a transistor is sufficiently lower than the output voltage +V1, the equation $+Va \approxeq +Vc$ is established. That is, the charging voltage +Vc of the smoothing capacitor C2 may be considered substantially equal to the output voltage +Va of the rectifying and, smoothing circuit 1. In the above-described state, the terminal voltages HL and LH between the tap L and terminal H of the secondary winding of the power transformer T is about ½ of the voltage 10 between the terminals H and G of the secondary winding as indicated by the broken-lined waveform 11 of FIG. 2. According to a charging loop made up of the tap L of the secondary winding and diodes D5, D1 and D2 (see also FIG. 5), the diode 5 is continuously reverse biased with the charging voltage +Vc of the main smoothing capacitor C2. Thus, the charging loop does not operate.

Figure 3:
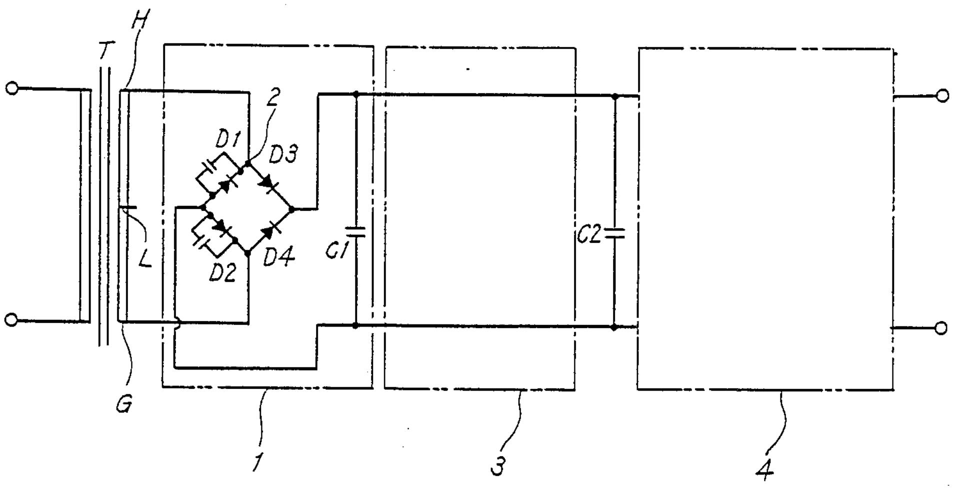
FIG. 3 is an illustration of the rectifying operation of the inventive system when the input voltage is of the 100 V-system.

Finally, in the case of the 100 V-system primary or input voltage, the equivalent of the circuit of this invention is as shown by FIG. 3. FIG. 3 briefly illustrates the voltage detector 3 and constant-voltage regulator stabilizer 4 but omits the reverse-biased diode D5 and transistor TR1 which is off, and shows all on transistors as short-circuits. The circuit of FIG. 3, as well known, constitutes a single-phase bridge rectifier.

Figure 4:
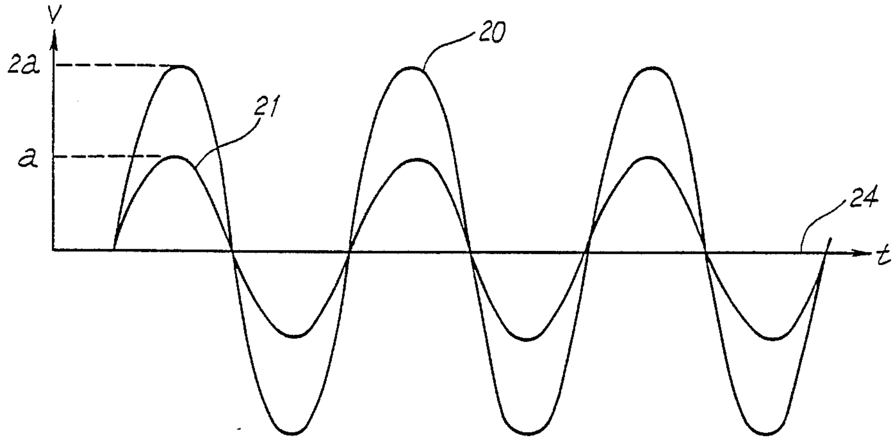
FIG. 4(*a*) and FIG. 4(*b*) are waveform diagrams illustrating the operation of the inventive system when the input voltage is of the 200 V-system.
Figure 4:
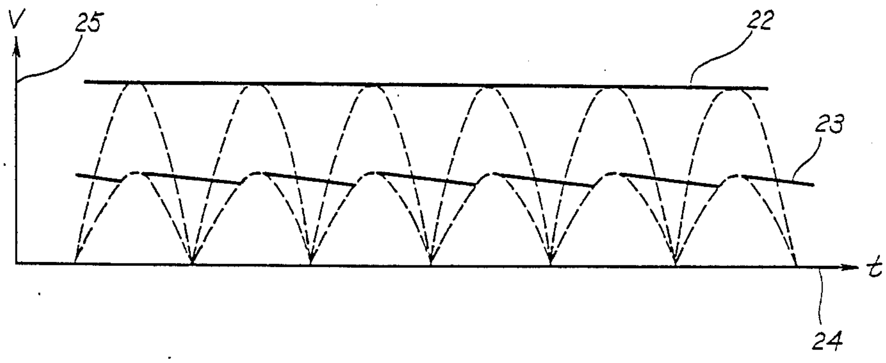

(2) Case of the 200 V-system primary or input voltage:

FIG. 4(*a*) and FIG. 4(*b*) are a waveform diagrams illustrating the operation of the case of the 200 V-system primary or input voltage of the direct current power supply. The solid-lined voltage waveform of an alternating current appearing across the terminals HG of the secondary winding of the power transformer is indicated at 20. The solid-lined voltage waveform of an alternating current appearing across the terminals HL or LG of the secondary winding is indicated at 21. The output voltage of the rectifying and, smoothing circuit 1 is indicated at 22. The charging voltage waveform of the main smoothing capacitor C2 is indicated at 23. The ordinate representing a voltage level is indicated at 25. The crest value of the waveform 21 is indicated at a. The crest value of the waveform 20 is indicated at 2*a*.

FIGS. 4(*a*), (*b*) are similar to FIGS. 2(*a*), (*b*) illustrating the 100 V-system case. The level of the waveform of FIG. 4(*a*) is about twice that of FIG. 2(*a*).

As understood from and 4(*a*), and 4(*b*), the voltage 20 across the secondary winding produces the direct current voltage 22 through the rectifying and smoothing circuit 1 of FIG. 1. The resulting direct current output voltage 22 is divided by the resistors R1 and R2 to produce the direct curent voltage +Vd. When the input voltage is of the 200 V-system, the values of the resistors R1 and R2 cause the level of the direct current voltage +Vd with its ripples to exceed the voltage drop ($V_{BE}$) between the base and emitter of the transistor Tr1 in order to pass base current. Thus, the transistor Tr1 is continuously on.

The values of the resistors R1 and R2 are selected relative to the voltage $V_{BE}$ between the base and emitter of the transistor Tr1 so that base current is interrupted in the case of the 100 V-system input and so that the enough base current is established in the case of the 200 V-system input.

When the transistor Tr1 is on, the subsequent transistor Tr2 is off since corresponding base current fails to pass. The switching transistor Tr4 is also off. The output voltage of the rectifying and smoothing circuit 1 fails to charge the main smoothing capacitor C2 but only charges the auxiliary voltage-detecting and smoothing capacitor C1 at the direct current voltage +Va for a voltage-detecting signal. In this state, the discharge current from the auxiliary smoothing capacitor C1 is low and includes less ripples as shown by the waveform 22 of FIG. 4(*b*) than the discharge current as shown by the waveform 14 of FIG. 2(*b*) since the switching transistor Tr4 is off.

Figure 5:
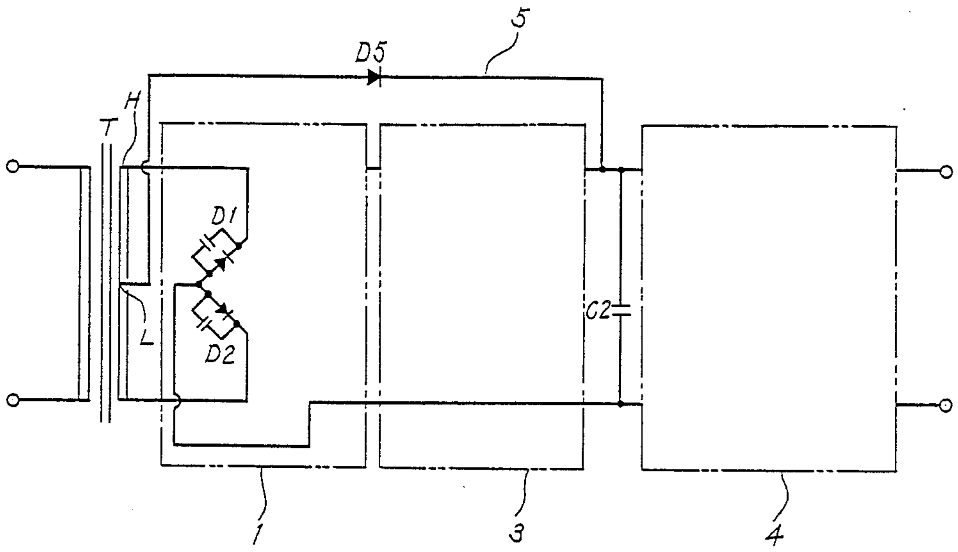
FIG. 5(*a*) is an illustration of the operation of the inventive system when the input voltage of the 200 V-system.
Figure 5:
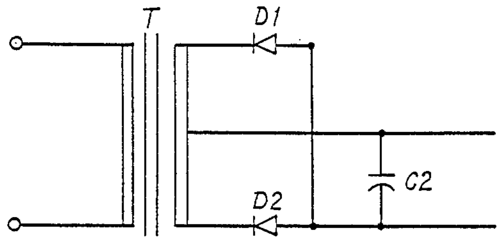

Since the voltage detector 3 fails to serve to charge the main smoothing capacitor C2, the voltage detector 3 and voltage-constant regulator stabilizer 4 are simplified as shown by FIG. 5(*a*) for a better understanding of the charging system. FIG. 5(*b*) illustrates the main part of the circuit of FIG. 5(*a*) for a further better understanding of the charging system. The circuit of FIG. 5(*b*) is equivalent to so-called center-tap-type single-phase all-wave rectifier.

Figure 6:
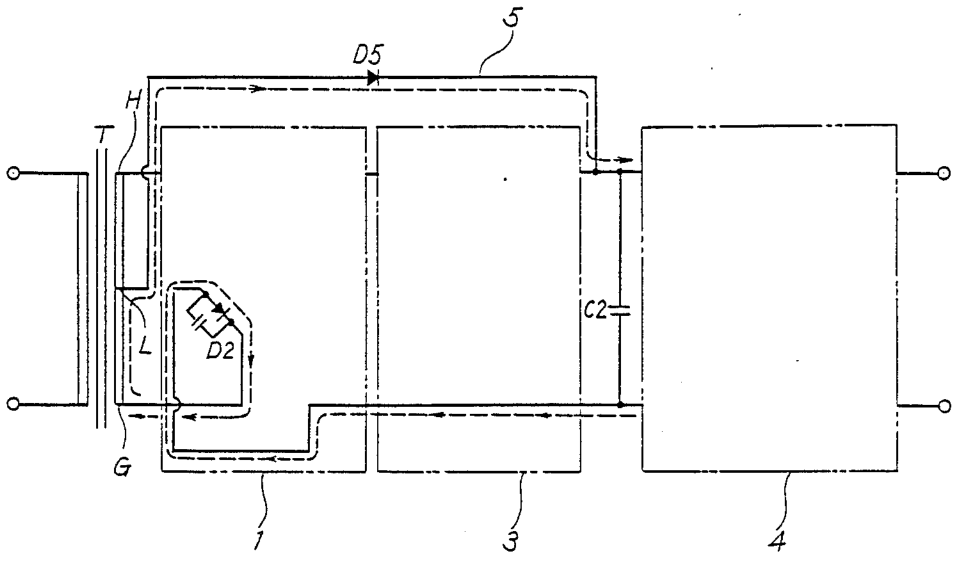
FIG. 6 is a diagram illustrating directions of current in a charging loop when the input voltage is of the 200 V-system.
Figure 7:
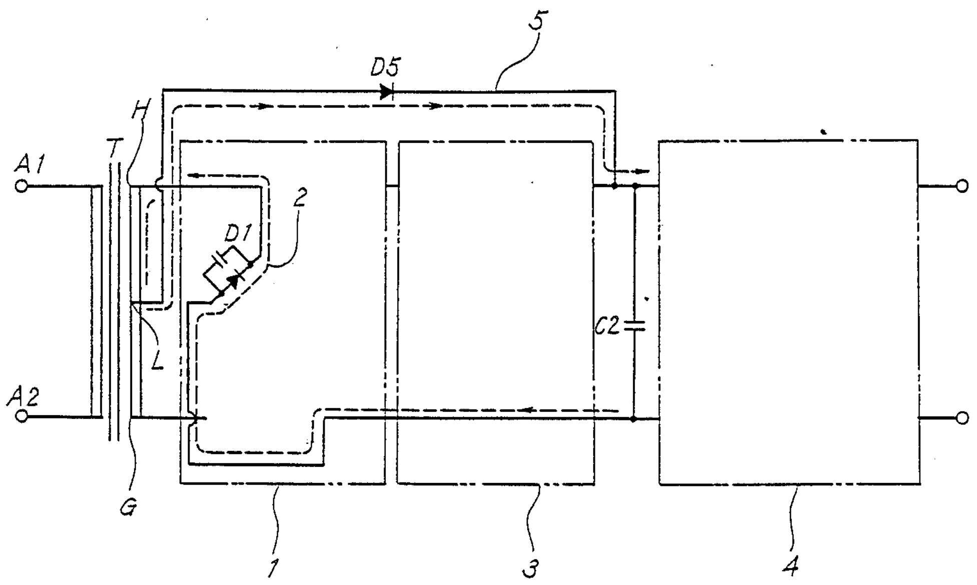
FIG. 7 is a diagram illustrating directions of current in the charging loop when the input voltage is of the 200 V-system.

FIGS. 6 and 7 illustrate directions of current flow in the charging loop according to the present embodiment.

FIG. 6 illustrates a case in which the order of induced voltages by the secondary winding is expressed as H>L>G. In this case, the terminals L and G of the secondary winding and the diodes D2 and D5 together serve to charge the main smoothing capacitor C2. When the order of induced voltages by the secondary winding is expressed as H<L<G, the terminals L and H of the secondary winding and the diodes D1 and D5 together serve to charge the main smoothing capacitor C2, as shown in FIG. 7.

Thus, the winding across the terminals H and L or terminals L and G of the secondary winding of the power transformer alternately charges the main smoothing capacitor C2. The voltages induced across the terminals H and L and terminals L and G are a ½ induced voltage across the terminals H and G. The waveform of a charging voltage of the main smoothing capacitor C2 is shown by the charging-voltage waveform 23 of FIG. 4(*b*) which corresponds to the waveform 14 of FIG. 2(*b*) illustrating the 100 V-system input case.

According to the embodiment of this invention, the charging voltages of the main smoothing capacitor C2 are substantially equal regardless of whether the 100 V-system has a or 200 V input voltage. A final constant-voltage output is produced by the ordinary constant-voltage regulator stabilizer 4 connected to the main smoothing capacitor C2.

Although the one embodiment of this invention has been described, this invention will not be limited to especially the present embodiment. Various methods by which the circuit is made up can be readily conceived. In addition, this invention is applicable to a direct current power supply system with 200 V-and 400 V-system primary or input voltages.

What is claimed is:

1. A direct current power supply converting alternating current to direct current and deriving a direct current output from an alternating current input, comprising:

- a power transformer having a secondary winding with a single center tap and a plurality of output terminals;
- a plurality of corresponding rectifying circuit systems connected to the output terminals one of which rectifies a voltage across the entire secondary winding and an other of which rectifies respective voltages across terminals of said secondary winding to said center tap to thereby use the entire secondary winding and produce a voltage less than that across the entire secondary winding;
- a voltage-detecting circuit detecting a predetermined level of an input alternating current voltage including a voltage divider connected to said secondary winding, and means, connected to an output of the voltage divider, for producing a state change based on a voltage from said output of the voltage divider; and
- a switching circuit, opening and closing paths to corresponding ones of said rectifying circuits in response to the detecting of a predetermined level that is done by the voltage-detecting circuit for selecting a proper rectifying circuit out of the plurality of rectifying circuits in response to a variation of the amplitude of the input alternating current voltage so as to suppress a variation of an output voltage wherein said switching circuit includes a transistor switch using a PNP Transistor and a diode connected to switch a positive output of said proper rectifying circuit,
- said transistor switch disposed between a terminal for the positive output of said proper rectifying circuit system and an output of the positive side, and
- said diode coupled between the center tap of the secondary winding of the power transformer and said output of the positive side to form an outflow circuit of a center-tapped-type single-phase full-wave-rectifying circuit system when the input alternating current voltage is high.

2. A direct current power supply as recited in claim 1, wherein output terminals across the secondary winding of the power transformer and the plurality of rectifiers connected to the output terminals together are switched by said switching circuit to form a single-phase bridge rectifying circuit system across the entire output of said secondary winding when the input alternating current voltage is low, and wherein the output terminals across the secondary winding and the tap of the secondary winding of the power transformer and the plurality of rectifiers connected to the terminals together are switched by said switching circuit to form a center-tap-type and single-phase full-wave-rectifying circuit system rectifying the voltage across the entire secondary winding, but forming a voltage less than the entire output of the secondary winding.

3. A direct current power supply as recited in claim 2, wherein the output terminals across the secondary winding of the power transformer are connected to alternating-current-side input points of the single-phase bridge rectifying circuit, and a direct current output of the single-phase bridge rectifying circuit is applied to the input-voltage-detecting circuit through a first smoothing capacitor and connected to a second smoothing capacitor through the switching circuit operating in response to the input-voltage-detecting circuit, and the tap of the power transformer is connected to the second smoothing capacitor through the rectifier.

4. A direct current power supply as recited in claim 1, 2 or 3, further comprising a constant-voltage regulator stabilizing circuit, connected to the rectifying circuit systems.

5. A power supply as in claim 1, wherein said single tap of said secondary winding is a center tap, and said plurality of rectifying circuit systems include at least a single phase bridge rectifier which rectifies a voltage across the entire secondary winding, and a center tap type full wave rectifier which full wave rectifies voltages between windings of said secondary, respectively, and said center tap.

6. A power supply as in claim 1, wherein said means for producing a state change is a transistor, having its base coupled to said voltage divider.

7. A power supply as in claim 6, wherein said voltage divider is a pair of resistors connected in series, and said base of said transistor is connected to a node between said resistors.

8. A power supply as in claim 7, wherein said switching circuit includes at least one transistor, connected to be controlled by said state change of said transistor of said voltage detecting circuit.

* * * * *